United States Patent [19]

Hsu

[11] Patent Number: 5,398,716
[45] Date of Patent: Mar. 21, 1995

[54] STRUCTURE OF AIR COMPRESSOR WASTE DRAIN VALVE

[76] Inventor: Chia-Tsung Hsu, No. 424-2, sec 1, Chung Shan Road, Chang Hua City, Taiwan, Prov. of China

[21] Appl. No.: 91,430

[22] Filed: Jul. 15, 1993

[51] Int. Cl.⁶ .................................................. F16T 1/20
[52] U.S. Cl. ........................................ 137/195; 137/192; 137/239; 137/546
[58] Field of Search ................ 137/192, 195, 239, 546

[56] References Cited

U.S. PATENT DOCUMENTS 2,744,534  5/1956  Faust et al. ......................... 137/195

Primary Examiner—Gerald A. Michalsky
Attorney, Agent, or Firm—Bacon & Thomas

[57] ABSTRACT

An air compressor waste drain valve having an automatic drain hole and a dust collector provided respectively at the center and circumference of the inside base of the drain valve so that the moisture produced by the air compressor can be stored in the dust collecting tank of a dust collector and the dust produced by the air compressor can pass through an overflow port of a hollow cover plate. After the moisture has accumulated to a sufficient level, the water will be drained automatically through the drain hole and the accumulated dust can be drained for collection by means of opening the valve, so as to achieve the respective drainage effort for water and dust. On the top of the overflow port, an air pressure hose is provided and fixed on the opening of a hole having a check valve inside which is connected with an air inlet, so that when the dust is adhered on the filter located in the overflow port, the air from the air inlet opens the check valve and a strong air pressure is applied through the nozzle of an air pressure hose to the filter to remove the dust.

3 Claims, 6 Drawing Sheets

STRUCTURE OF AIR COMPRESSOR WASTE DRAIN VALVE

BACKGROUND OF THE INVENTION

The present invention relates to an improved structure of an air compressor waste drain valve having an automatic drain hole and a dust collector provided respectively at the center and circumference of the inside base of the drain valve so that the moisture produced by the air compressor can be stored in the dust collecting tank of a dust collector by means of a hollow filter and the dust produced by the air compressor can be overflown through the overflow port of the hollow cover plate, after the moisture has been accumulated to the sufficient level to ascend the float ball to drive the connecting rod gear, the water will be escaped automatically through the drain hole and the dust will be accumulated to a certain quantity and then can be drained for collection by means of opening the valve, so as to achieve the respective drainage effort for water and dust, thus on the one hand it can avoid the dust blockage in the automatic drain hole, on the other hand it can meet the environmental requirements against water pollution; furthermore, on the top of the overflow port an air pressure hose is provided and fixed on the opening of a vertical hole having a check valve inside and is connected with an air inlet, so that when the dust is adhered on the filter located in the overflow port, it needs not to be removed for cleaning, just simply fill the air from the air inlet to open the check valve and apply strong air pressure through the nozzle of an air pressure hose to the filter to remove the dust and let the dust be exhausted from the valve to achieve the convenient cleaning effect.

Referring to FIGS. 1 and 2, the air compressor of a conventional drain valve has to be arranged on the top position and installed on the bottom of an air storage tank, so that the air can continuously enter into the cup body D through the air inlet A1 of the cover A by means of the micro exhaust of the micro adjustment exhaust valve, the airflow will then be blocked by the distribution disk, on the one hand the dust will be blocked on the distribution disk B, on the other hand the water will flow to the bottom of the cup body, however, the dust will be also taken along by the water and flown to the bottom of the base D, since the semi-spherical piston head F1 of the piston rod F is still plugged on the cushion G1 of the drain hole G, the water is going on accumulation until the float ball E is slowly ascending and finally drives the connecting rod H to move the actuating rod H1 and to activate the air inlet pipe connector to move downwards to release the air outlet C1 from the blockage of diaphragm B2, at this moment the airflow will enter the diaphragm chamber C2 through the air outlet pipe connector to make the diaphragm B2 be compressed upwards to ascend the piston rod F as well as to compress the compression spring B1, the said semi-spherical piston head F1 will then leave the drain hole G to drain the water from the drain hole G automatically, at the same time the piston rod F will be returned rapidly by means of the compression spring B1 to make the said semi-spherical piston head F1 return to the cushion G1 position and block the drain hole, at this moment the said float ball E will be descended and activate the connecting rod H, thus the return spring H2 by means of its return elasticity after stretching will drive the actuating rod H1 to actuate the air outlet pipe connector C to ascend to make the air outlet C1 return and be blocked by the diaphragm B2 to achieve the automatic drainage. However, because of the frequency of the vertical displacements of the said piston rod F as well as the fluctuation of the airflow and the water, the piston rod F will be easily deflected while reversing, thus the center of the semi-spherical piston head F1 will be impossible to return exactly on the cushion G1 and produces a clearance, as a result a big quantity of airflow will be escaped from this clearance, therefore, not only the moisture and dust of the air produced by the air compressor can not be filtered but also the air pressure output will be also considerably reduced; furthermore, much quantity of dust (e.g. rusty chips from the air storage tank of the air compressor, sands etc.) will be contained in the produced air pressure and will be easily to be blocked on the distribution disk B and drain hole G, as a result insufficient air pressure will b entered into the cup body D and will be impossible to thrust the diaphragm B2 to drive the piston rod F moving upwards to drain the water, even the semi-spherical piston head F1 will produce leakage due to the blockage of dust. In addition to the above mentioned drawbacks, such design can only be installed in suspension or horizontal position and is impossible to be installed vertically.

SUMMARY OF THE INVENTION

The present invention eliminates the aforesaid drawbacks. The primary object of the present invention is to provide an improved structure of air compressor waste drain valve having an automatic drain hole and a dust collector provided respectively at the center and circumference of the inside base of the drain valve so that the moisture produced by the air compressor can be stored in the dust collecting tank of a dust collector by means of hollow filter and the dust produced by the air compressor can be overflown through the overflow port of the hollow cover plate, after the moisture has been accumulated to the sufficient level to ascend the float ball to drive the connecting rod gear, the water will be escaped automatically through the drain hole and the dust will be accumulated to a certain quantity and then can be drained for collection by means of opening the valve, so as to achieve the respective drainage effort for water and dust, thus on the one hand it can avoid the dust blockage in the automatic drain hole, on the other hand it can meet the environmental requirements against water pollution. It is another object of the present invention to provide an improved structure of air compressor waste drain valve, that on the top of the overflow port an air pressure hose is provided and fixed on the opening of a vertical hole having a check valve inside and is connected with an air inlet, so that when the dust is adhered on the filter located in the overflow port it needs not to be removed for cleaning, just simply fill the air from the air inlet to open the check valve and apply strong air pressure through the nozzle of an air pressure hose to the filter to remove the dust and let the dust be exhausted from the valve to achieve the convenient cleaning effect without requiring any kind of tool. It is still another object of the present invention to provide an improved structure of air compressor waste drain valve that a T-shaped by-pass pipe base can be arranged on the top of the cup body and can be connected with the air intake pipe with a connection pipe to make the air inlet of the said drain valve be switched to any T-shaped by-pass pipe for optional horizontal, vertical or suspension installation.

BRIEF DESCRIPTION OF THE DRAWING

The present invention will now be described by way of example with reference to the annexed drawings, in which.

DETAILED DESCRIPTION OF THE PREFERRED EMBODIMENT

Figure 4:
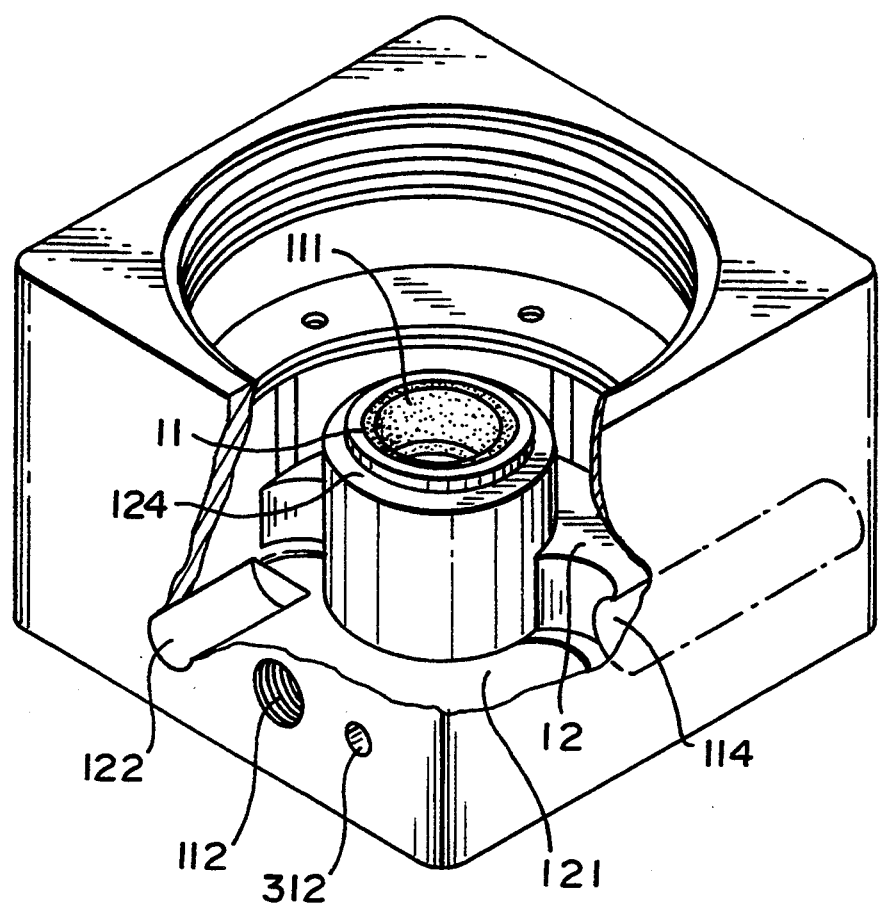
Fig.4 is a cross-sectional view of the base of the exemplified embodiment of the present invention.
Figure 5:
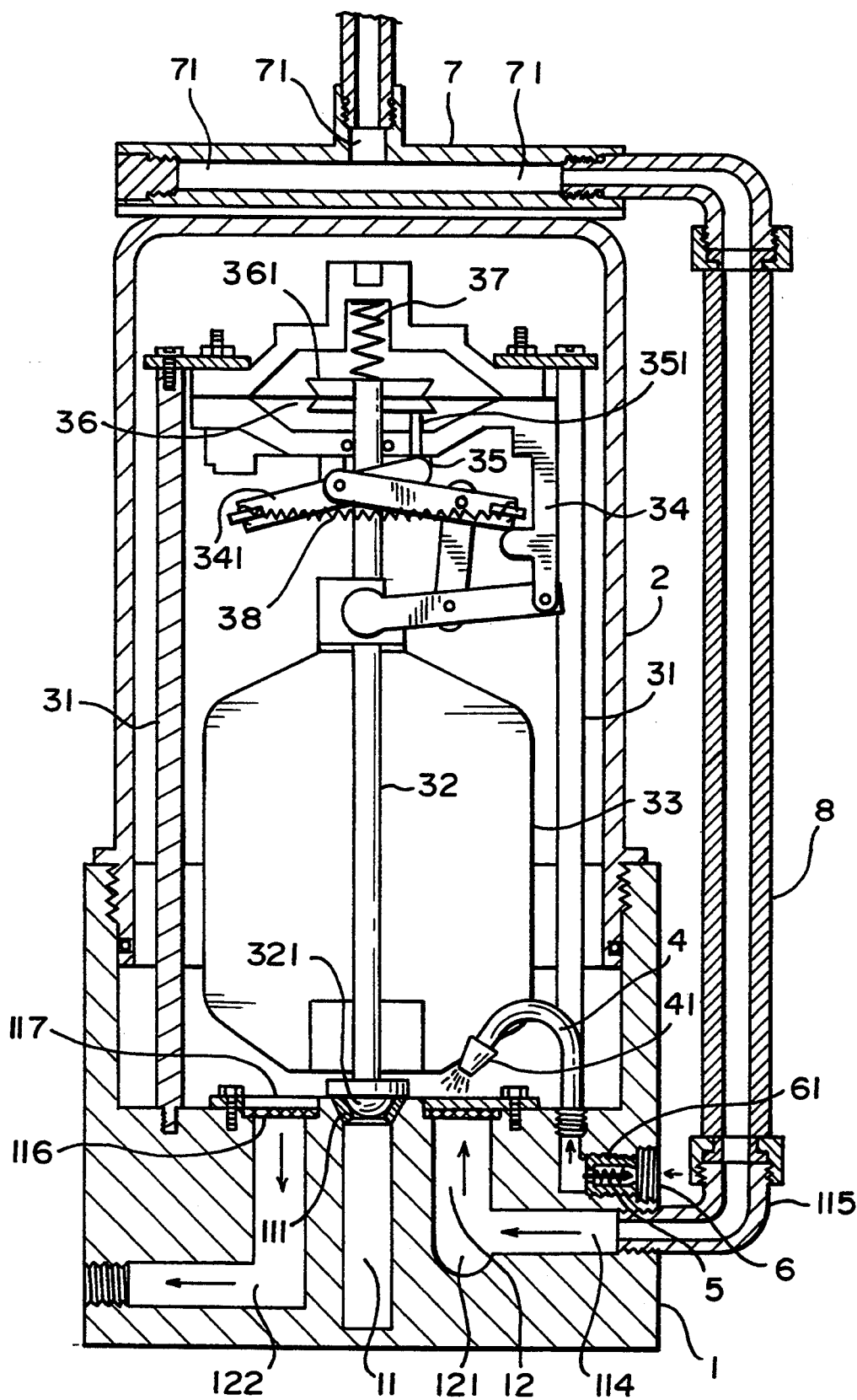
FIG. 5 is a cross-sectional view showing the position of the dust drain hole and air inlet of the exemplified embodiment of the present invention.

Referring to FIG. 4, an automatic drain hole 11 is provided at the center of the inside base 1 and a cushion 111 is arranged on the top of the drain hole, a dust collector is provided at the circumference of the automatic drain hole 11 and at its proper bottom position a slightly inclined dust collecting tank 121 is provided ; whereby the said automatic drain hole 11 is only connected with the drain pipe connector 11 of the drain hole 112 arranged at the side of the base 1, while the inclined end of the said dust collecting tank 121 is connected with the valve 123 which is arranged at the dust drain hole 122, and its slope starting point is connected to the air intake pipe connector 115 of the air inlet 114 (as illustrated in FIG. 5).

Figure 1:
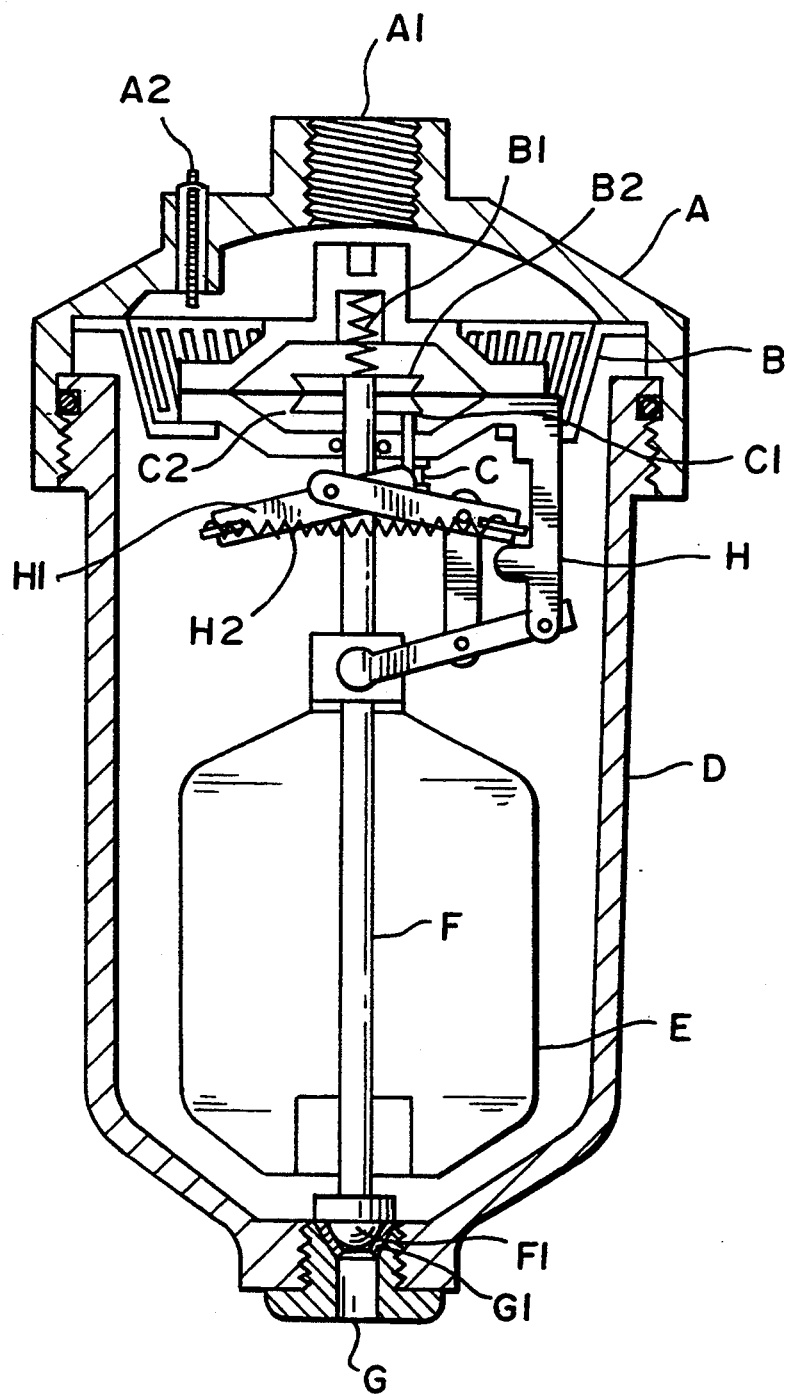
Fig.1 is a cross-sectional view of a conventional drain valve under water collection condition.
Figure 2:
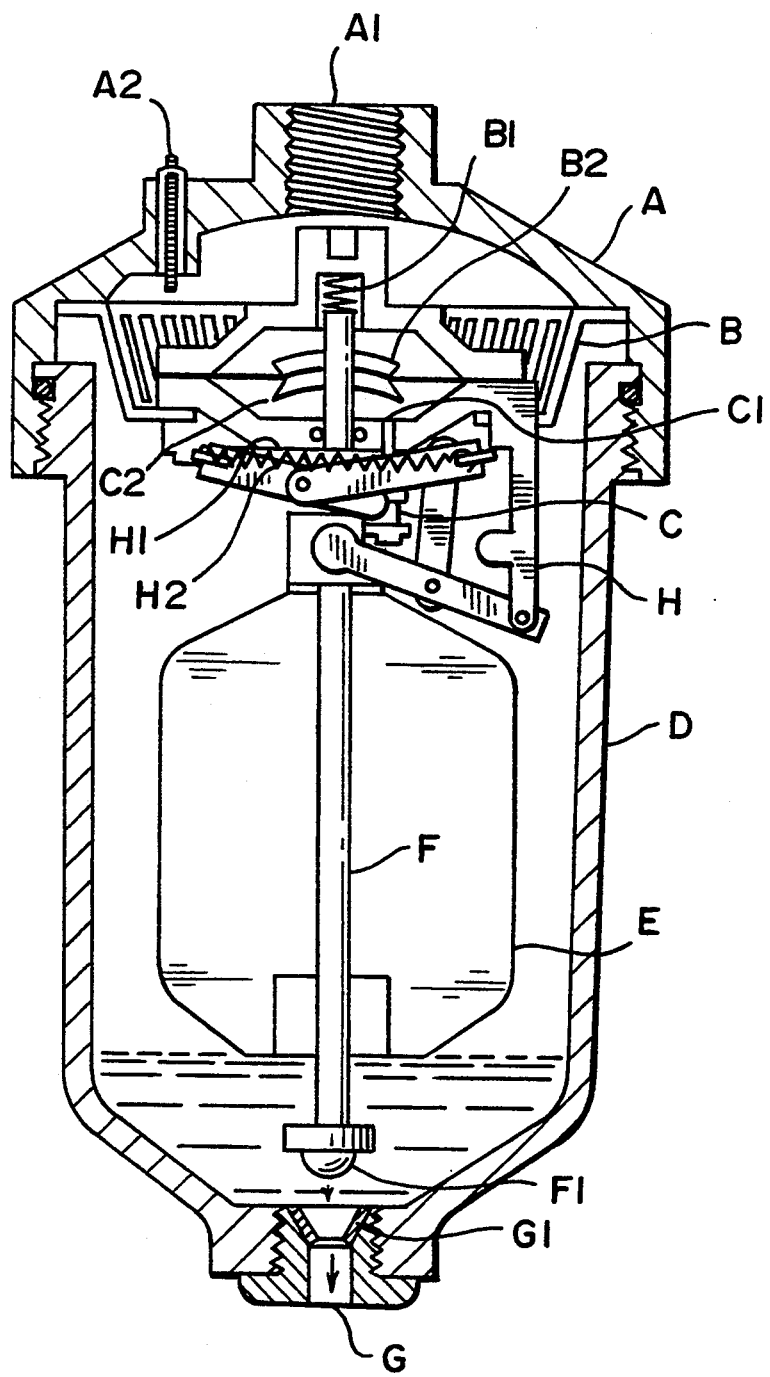
Fig.2 is a cross-sectional view of a conventional drain valve under water drainage condition.
Figure 3:
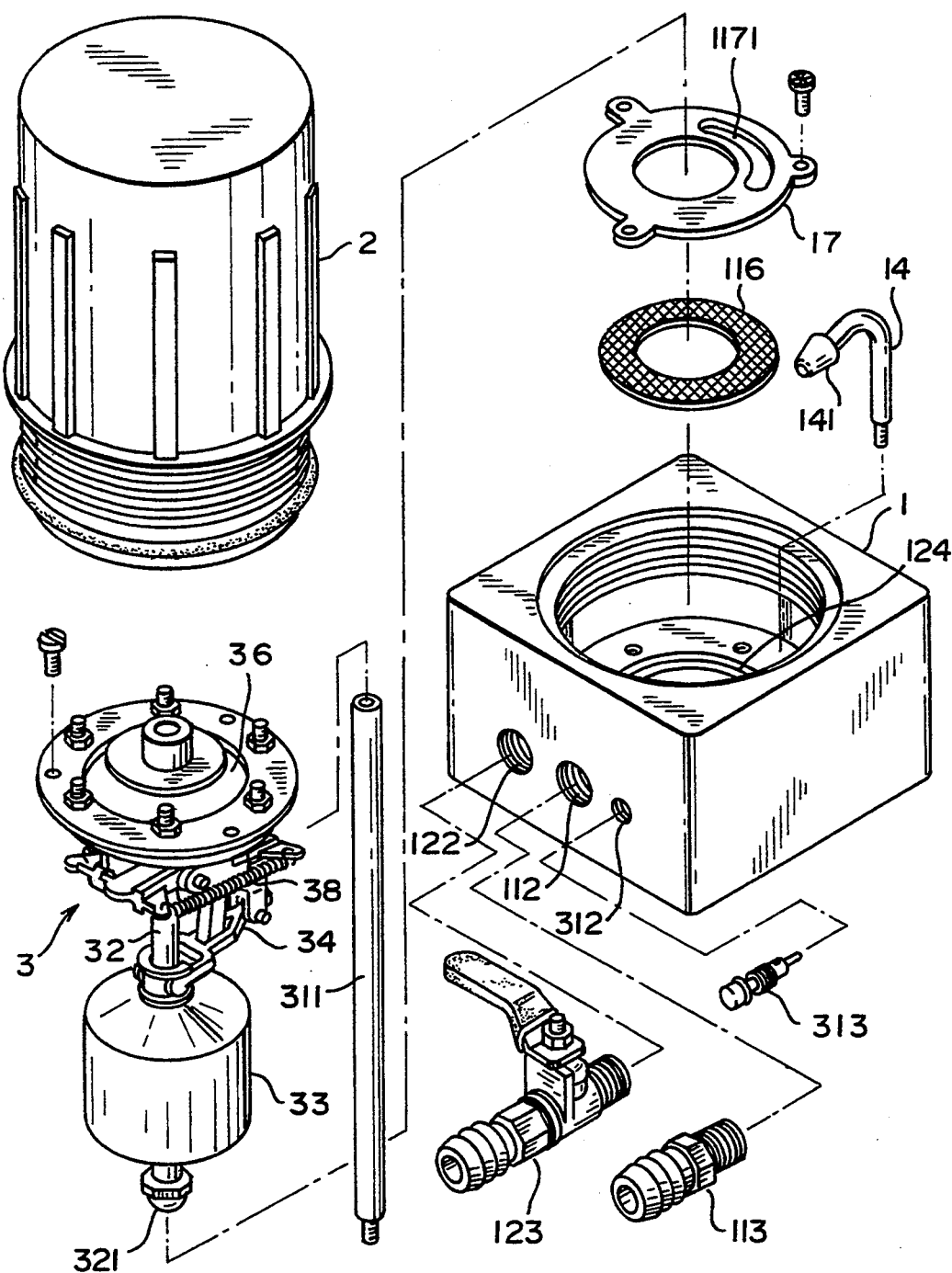
Fig.3 is a perspective exploded view of the exemplified embodiment of the present invention.

Referring to FIG. 3 and 5 , a hollow filter 116 is put on the top of the stepped flange 124 of the dust collector 12, a hollow cover plate 117 will be put on the hollow filter 116 and fixed, an overflow port 1171 is provided at the proper position of the cover plate 117, the automatic drain hole 11 is protruded at its center position through the hollow filter 116 and the hollow cover plate 117, so that the float ball driving mechanism 3 inside the cup body 2 will be fixed on the drain valve base 1 by means of several fixing rods 31, in order to secure that the semi-spherical piston head 321 of the piston rod 32 during vertical movements will not be deflected from the automatic drain hole 11 and by means of one of the several fixing rods which is provided with an air outlet pipe 311 to be connected to the adjusting valve 313 for guiding the air to enter into the dust collector 12 from the air inlet 114 to accumulate the moisture and dust contained in the air in the dust collecting tank 121.

Figure 6:
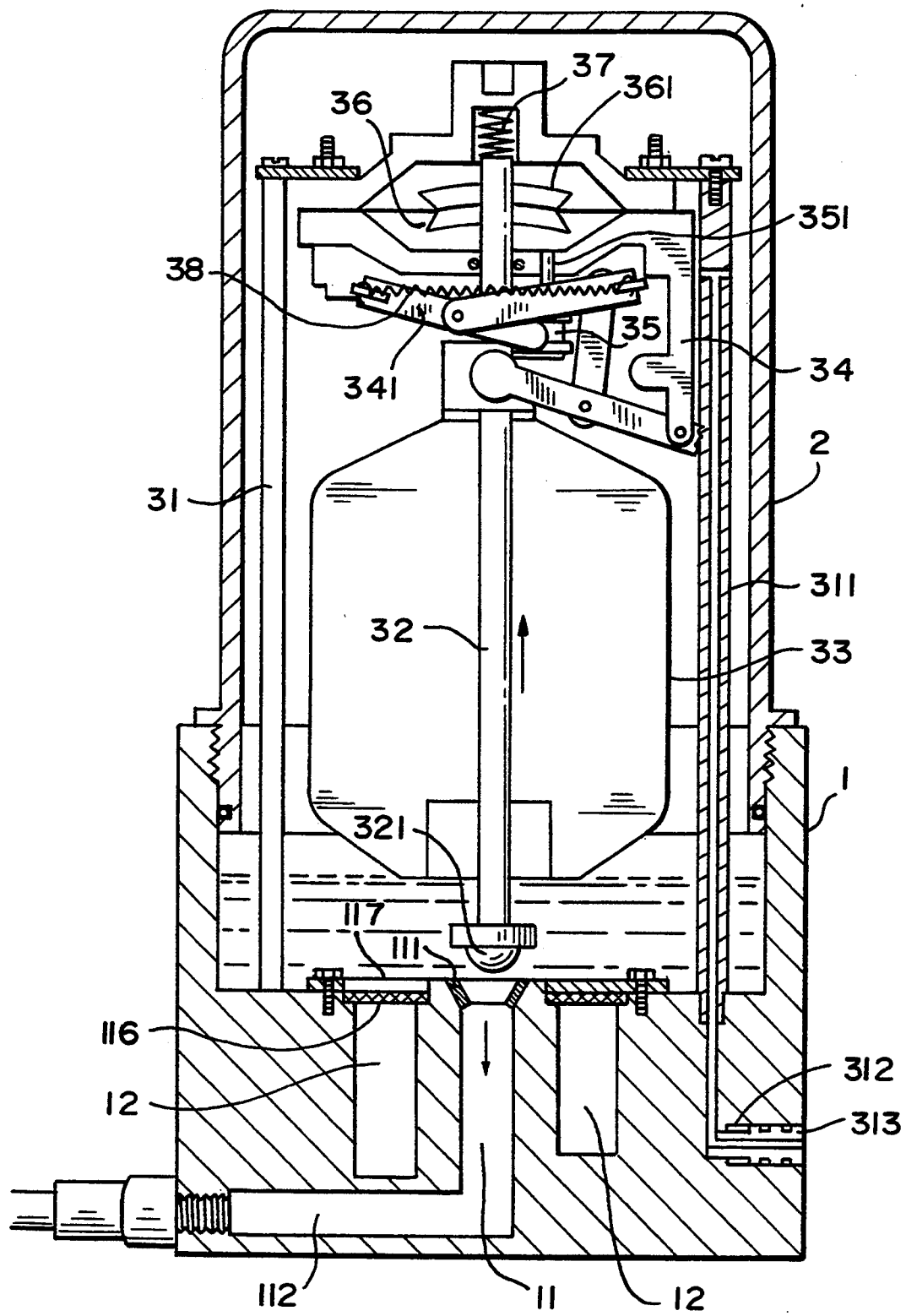
FIG. 6 is a cross-sectional view illustrating the position of the automatic drain hole of the exemplified embodiment of the present invention.

Referring to FIG. 6, the said moisture will pass through the hollow filter 116 to filtrate the dust and then escape from the overflow port 1171 of the hollow cover plate 117, and after the moisture has been accumulated to the sufficient level to ascend the float ball 33 to drive the connecting rod gear 34, making its actuating rod 341 to descend the air outlet pipe connector 35 so that the air can be entered into the watertight diaphragm chamber 36 from air outlet pipe connector 35, by means of the said air pressure to thrust the diaphragm 361 to move the said piston rod 32 upwards for releasing the semi-spherical piston head 321 from the automatic drain hole 11, thus the water will be drained from the automatic drain hole 11, after the water is completely drained and the float ball 33 is ascended and returned to a fixed position, the connecting rod mechanism 34 under compression of the compression spring 37 will make the piston rod 32 reverse rapidly to open status and the said actuating rod 341 being compressed by the return spring 38 will bring the air outlet pipe connector 35 to its starting position, so that its air outlet 351 will be blocked by the diaphragm 361; various kinds of dusts accumulated in the dust collecting tank 121 will be then escaped through the opening of the valve 123. Furthermore on the top of the overflow port 1171 an air pressure hose is provided and fixed on the opening of a vertical hole 61 having a check valve 5 inside and is connected with an air inlet 6, so that when the dust is adhered on the filter 116, it needs not to be removed for cleaning, just simply fill the air from the air inlet 6 and apply strong air pressure through the nozzle 41 of an air pressure hose 4 to the filter to remove the dust, so that it is easy for cleaning and the dust-free water and the dirty waste water can be drained respectively to meet the environmental purification requirements.

Referring again to Fig. 5, a T-shaped by-pass pipe base 7 can be arranged on the top of the cup body 2 and can be connected with the air intake pipe connector 115 with a connection pipe 8 to make the air inlet 114 of the said drain valve be switched to a T-shaped by-pass pipe 71 of the T-shaped by-pass pipe base for optional horizontal, vertical or suspension installation.

As indicated, the improved structure of an air compressor waste drain valve of the present invention allows the water and dust can be drained respectively and while cleaning the dusts adhered on the filter, it can be cleaned directly without the need to dismantle the drain valve. Furthermore, it can be optionally installed subject to the respective drain valve model.

What is claimed is:

1. An improved structure for an air compressor waste drain valve actuated by a float ball driving mechanism by accumulation of water to make a float ball ascend for actuating a connection rod mechanism to drive a piston rod upwards to open the drain valve so as to achieve automatic water drainage comprising:

a base provided with an automatic drain hole at a center position having a cushion on a top of the drain hole, a dust collector provided at a circumference of the automatic drain hole having an inclined dust collecting tank; first means connecting the automatic drain hole with a drain pipe connector arranged at a side of the base; second means connecting the inclined dust collecting tank with a valve located in a dust drain hole, and with an air intake pipe connector of an air inlet;

a plurality of fixing rods attaching the float ball driving mechanism to the base so as to locate a semispherical piston head on the automatic drain hole for watertight operation; and an air pressure hose having a nozzle located on top of an overflow port and a check valve connected with an air inlet;

whereby waste water and dust accumulating in the structure can be separately drained, while preventing any blockage of the automatic drain hole.

2. The improved structure for an air compressor waste drain valve of claim 1, further comprising an air outlet pipe defined by one of the plurality of fixing rods connected with an adjusting valve for regulating a micro pressure exhaust for controlling airflow entering into the drain valve.

3. The improved structure for an air compressor waste drain valve of claim 1, further comprising a T-shaped bypass pipe base located on a top of a cup body attached to the base and connected with an air intake pipe connector by a connection pipe so as to facilitate optional horizontal, vertical or suspended installation of the structure.

* * * * *